Figure 5:
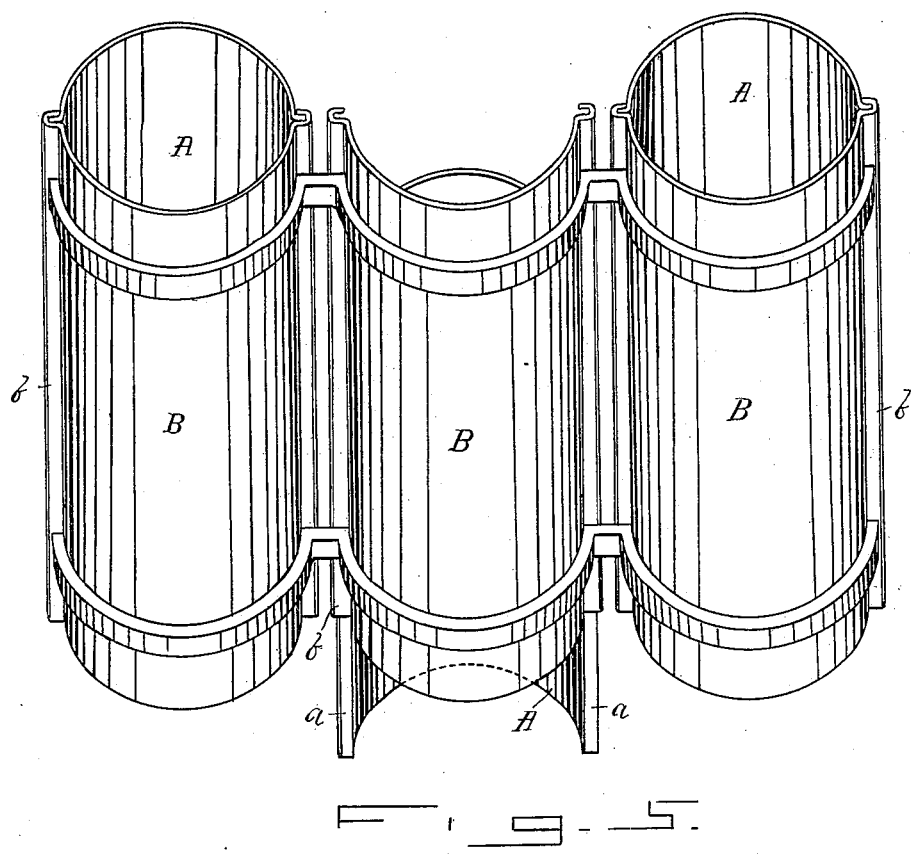

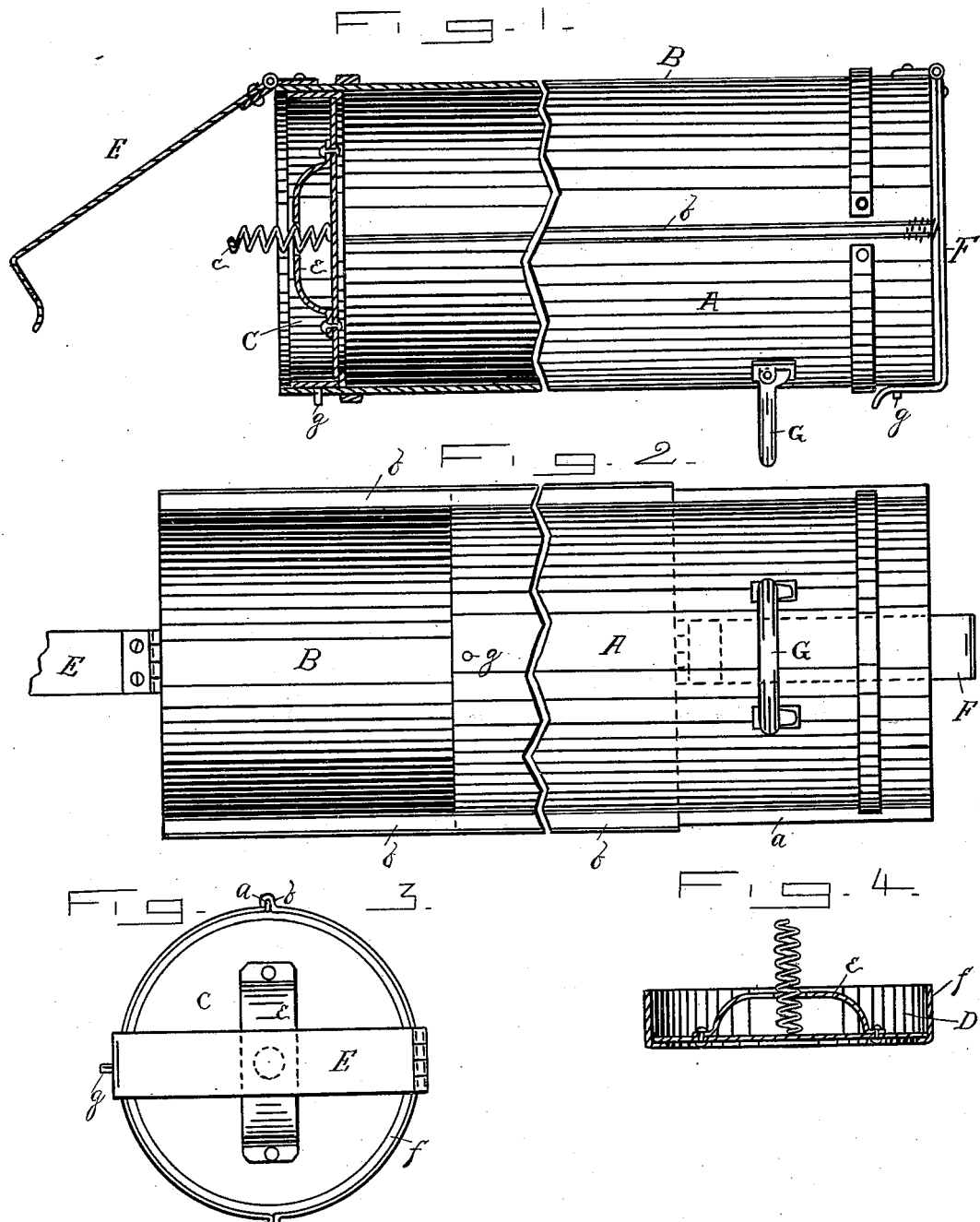

(No Model.) 2 Sheets—Sheet 2.

B. F. ORTMAN.
BREAD PAN.

No. 345,316. Patented July 13, 1886.

Witnesses:
Otto Hoddick.
Byron H. Daggett

Inventor.
B. F. Ortman
By Silas J. Douglass
Attorney.

UNITED STATES PATENT OFFICE.

BARNIM F. ORTMAN, OF BUFFALO, NEW YORK, ASSIGNOR TO GEORGE URBAN, JR., OF SAME PLACE.

BREAD-PAN.

SPECIFICATION forming part of Letters Patent No. 345,316, dated July 13, 1886.

Application filed March 18, 1886. Serial No. 195,756. (No model.)

*To all whom it may concern:*

Be it known that I, BARNIM F. ORTMAN, a citizen of the United States, residing at the city of Buffalo, in the county of Erie and State of New York, have invented a new and useful Improvement in Bread-Pans, of which the following is a specification.

My invention relates to household appliances, and is an improvement in bread-pans.

The objects of my invention are to provide a means for shaping the loaf to allow for any extra expansion thereof, to facilitate the placing of the dough within the pan, and the removal of the loaf therefrom, and to confine the gases of the loaf while it is baking.

To accomplish the objects of my invention, I form the pan of detachable sections so shaped as to give to the loaf the configuration desired, and then I close the ends of these sections by means of movable caps, which will yield to any undue pressure from the loaf.

The accompanying drawings fully illustrate the construction of the pan.

Figure 1 is a side view of the pan with a portion broken away, so as to illustrate the manner of closing the ends thereof. Fig. 2 is a similar view of the pan, showing the sections partially separated, and the method of opening and closing the pan. Fig. 3 is an end view of the pan, showing the manner of joining the sections. Fig. 4 is a sectional view of one of the caps; and Fig. 5, Sheet 2, is a perspective view of a nest of pans.

Similar letters refer to similar parts throughout the several views.

A and B represent the two sections of the pan; C and D, the caps; $c$, a coil-spring attached to the caps, and $e$ a handle thereon, and $f$ the outer rim thereof. E and F are latches for holding the caps in place, and G a handle for separating the sections, and $a$ and $b$ are the folds forming the joint. The sections are identical, except their edges $a$ $a$ and $b$ $b$. The edges of A are turned up, so as to form a simple flange, $a$ $a$, while those of B are doubled over to receive those of A in a groove, $b$ $b$. The two sections are united to form a pan or mold by simply inserting the end of the flanges $a$ $a$ within the grooves $b$ $b$, and forcing A along until the ends of A and B are even. The ends of the pan or mold are closed by caps C and D. These are formed with their rims $f$ $f$ turned upward, instead of downward, and are adapted to be forced bodily within the pan or mold, completely closing the end thereof, as shown in Fig. 1. To each cap is attached a handle, $e$, and a spiral spring, $c$, which is seated on the cap and passes up through a perforation in the handle $e$ and meets the latch E. The latches are simple straps of metal hinged at the ends of the section B, and adapted to extend across the ends of A and B and engage with $g$, a simple catch thereon. The sections A and B are stiffened by rigid bands at either end thereof, as shown, or the sections B may be attached in sets of two, three, or more to a pair of bed plates or sills, (see Sheet 2, Fig. 5,) thereby forming a nest of pans or molds, and the sections may be formed so as to give the loaf any shape desired. The caps being movable and held in position by friction and the force of the coil-springs only, it follows that extra pressure upon the caps will force them along, so as to furnish extra room for the loaf, and at the same time keep the pan sufficiently tight to prevent undue escape of the gases, and thereby preserve and improve the flavor of the loaf.

What I claim, therefore, and desire to secure by Letters Patent of the United States, is—

The herein shown and described bake pan or mold, composed of open-ended sections A and B, removably connected to facilitate the filling or emptying of the pan, movable caps placed within the sections, united fastening-bars, and springs interposed between such bars and caps, thereby allowing for expansion of the loaf, substantially as shown, and for the purpose set forth.

BARNIM F. ORTMAN.

Witnesses:
SILAS J. DOUGLASS,
TOBIAS WITMER, Jr.